(12) United States Patent
Cham et al.

(10) Patent No.: US 11,584,110 B2
(45) Date of Patent: Feb. 21, 2023

(54) MULTI-LAYERED PACKAGING FILMS

(71) Applicant: Frito-Lay North America, Inc., Plano, TX (US)

(72) Inventors: Pak Meng Cham, Plano, TX (US); Sridevi Narayan-Sarathy, Plano, TX (US); Brad Dewayne Rodgers, Frisco, TX (US); Adam Johnson, Bainbridge, GA (US); Satyabrata Samanta, Bainbridge, GA (US)

(73) Assignee: PepsiCo, Inc., Purchase, NY (US)

( * ) Notice: Subject to any disclaimer, the term of this patent is extended or adjusted under 35 U.S.C. 154(b) by 295 days.

(21) Appl. No.: 16/943,866

(22) Filed: Jul. 30, 2020

(65) Prior Publication Data

US 2022/0032586 A1 Feb. 3, 2022

(51) Int. Cl.
| | |
|---|---|
| *B32B 23/04* | (2006.01) |
| *B32B 7/12* | (2006.01) |
| *B32B 15/09* | (2006.01) |
| *B32B 27/10* | (2006.01) |
| *B32B 27/20* | (2006.01) |
| *B32B 27/36* | (2006.01) |
| *B32B 37/16* | (2006.01) |
| *B32B 38/00* | (2006.01) |

(52) U.S. Cl.
CPC .............. *B32B 23/042* (2013.01); *B32B 7/12* (2013.01); *B32B 15/09* (2013.01); *B32B 27/10* (2013.01); *B32B 27/20* (2013.01); *B32B 27/36* (2013.01); *B32B 37/16* (2013.01); *B32B 38/145* (2013.01); *B32B 2307/7163* (2013.01); *B32B 2367/00* (2013.01); *B32B 2439/70* (2013.01)

(58) Field of Classification Search
CPC ............... B32B 27/20; B32B 2439/70; B32B 2307/7163; B32B 27/36; B32B 15/09; B32B 7/12
See application file for complete search history.

(56) References Cited

U.S. PATENT DOCUMENTS

| | | | |
|---|---|---|---|
| 5,292,860 | A | 3/1994 | Shiotani et al. |
| 5,602,227 | A | 2/1997 | Noda |
| 5,618,555 | A | 4/1997 | Tokuda et al. |
| 5,650,555 | A | 7/1997 | Somerville et al. |
| 5,821,299 | A | 10/1998 | Noda |
| 5,849,854 | A | 12/1998 | Noda |
| 5,883,199 | A | 3/1999 | McCarthy et al. |
| 5,899,339 | A | 5/1999 | Noda |

(Continued)

FOREIGN PATENT DOCUMENTS

| | | |
|---|---|---|
| EP | 2202267 | 12/2011 |
| EP | 2881435 | 10/2015 |

(Continued)

OTHER PUBLICATIONS

Bio-Based Fillers Provide Eco-Friendly Solutions (AZO Materials) (Year: 2021).*

(Continued)

*Primary Examiner* — Ellen S Hock
(74) *Attorney, Agent, or Firm* — Barnes & Thornburg LLP; G. Peter Nichols

(57) ABSTRACT

A multi-layered packaging film includes (a) an outer print layer, (b) an inner product-side layer, and (c) a lamination layer interposed between the outer print layer and the inner product-side layer.

48 Claims, 6 Drawing Sheets

(56) References Cited

U.S. PATENT DOCUMENTS

| | | | |
|---|---|---|---|
| 5,918,747 A | 7/1999 | Noda | |
| 5,942,597 A | 8/1999 | Noda et al. | |
| RE36,548 E | 2/2000 | Noda | |
| 6,027,787 A | 2/2000 | Noda | |
| 6,077,931 A | 6/2000 | Noda | |
| 6,111,004 A | 8/2000 | Biesiada et al. | |
| 6,828,074 B2 | 12/2004 | Yano et al. | |
| 7,811,352 B2 | 10/2010 | Binder et al. | |
| 7,943,218 B2 | 5/2011 | Knoerzer et al. | |
| 7,951,436 B2 | 5/2011 | Knoerzer et al. | |
| 8,105,667 B2 | 1/2012 | Knoerzer et al. | |
| 8,519,053 B2 | 8/2013 | Tian et al. | |
| 8,795,803 B2 | 8/2014 | Paolilli et al. | |
| 8,822,584 B2 | 9/2014 | Whitehouse | |
| 8,937,135 B2 | 1/2015 | Steinke et al. | |
| 9,023,443 B2 | 5/2015 | Paolilli et al. | |
| 9,206,311 B2 | 12/2015 | Steinke et al. | |
| 9,267,011 B2 | 2/2016 | Cotton et al. | |
| 9,328,239 B2 | 5/2016 | Krishnaswamy | |
| 9,353,258 B2 | 5/2016 | Krishnaswamy et al. | |
| 10,113,060 B2 | 10/2018 | Krishnaswamy et al. | |
| 10,351,665 B2 | 7/2019 | Arnold et al. | |
| 10,457,782 B2 | 10/2019 | Johnson et al. | |
| 2002/0052445 A1 | 5/2002 | Terada et al. | |
| 2003/0015530 A1* | 1/2003 | Shepler | B65D 1/28 206/505 |
| 2006/0058498 A1 | 3/2006 | Satkowski et al. | |
| 2009/0061126 A1 | 3/2009 | Knoerzer et al. | |
| 2010/0221560 A1 | 9/2010 | Knoerzer et al. | |
| 2011/0171461 A1 | 7/2011 | Sanfilippo et al. | |
| 2012/0041109 A1 | 2/2012 | Krishnaswamy | |
| 2012/0108743 A1 | 5/2012 | Krishnaswamy et al. | |
| 2012/0177859 A1* | 7/2012 | Gavel | G09F 3/10 428/221 |
| 2014/0030536 A1 | 1/2014 | Krishnaswamy | |
| 2014/0235771 A1 | 8/2014 | Suwa et al. | |
| 2015/0094416 A1 | 4/2015 | Steinke et al. | |
| 2015/0203674 A1 | 7/2015 | Weinlein et al. | |
| 2015/0210801 A1 | 7/2015 | Abe et al. | |
| 2016/0053111 A1 | 2/2016 | Krishnaswamy et al. | |
| 2016/0096917 A1 | 4/2016 | Li et al. | |
| 2016/0108233 A1 | 4/2016 | Kann et al. | |
| 2016/0257098 A1 | 9/2016 | Nissenbaum et al. | |
| 2017/0181427 A1 | 6/2017 | Shani et al. | |
| 2018/0334564 A1 | 11/2018 | Andrews et al. | |
| 2020/0367490 A1 | 11/2020 | Van Trump et al. | |
| 2020/0369872 A1 | 11/2020 | Van Trump et al. | |
| 2020/0369909 A1 | 11/2020 | Grubbs, III et al. | |

FOREIGN PATENT DOCUMENTS

| | | | |
|---|---|---|---|
| JP | H08239386 | * | 9/1996 |
| WO | 9416000 | | 7/1994 |
| WO | 0228969 | | 4/2002 |
| WO | 2009137058 | | 5/2009 |
| WO | 2011103319 | | 8/2011 |
| WO | 2014165315 | | 10/2014 |
| WO | 2015149029 | | 3/2015 |
| WO | 2016172039 | | 4/2016 |
| WO | 2017087265 | | 11/2016 |
| WO | 2018058193 | | 9/2017 |

OTHER PUBLICATIONS

Ahn et al., "Synthesis and Characterization of the Biodegradable Copolymers from Succinic Acid and Adipic Acid with 1,4-Butanediol," Journal of Applied Polymer Science, vol. 82, 2808-2826 (2001).

Bhubalan et al., "Controlled Biosynthesis and Characterization of poly(3-hydroxybutyrate-co-3-hydroxyvalerate-co-3-hydroxyhexanoate) from mixtures of palm kernel oil and 3HV-precursors," Polymer Degradation and Stability vol. 93, 17-23 (2008).

Bhubalan et al., "Improved Synthesis of P(3HB—co—3HV—co—3HHx) Terpolymers by Mutant Cupriavidus Necator Using the PHA Synthase Gene of *Chromobacterium* sp. USM2 with High Affinity Towards 3HV," Polymer Degradation and Stability vol. 35, 1436-1442 (2010).

Sudesh et al., "Synthesis of Polyhydroxyalkanoate from Palm Oil and Some New Applications," Appl Microbiol Biotechnol vol. 89, 1373-1386 (2011).

Gerard et al., "PLA-PHA Blends: Morphology, Thermal and Mechanical Properties," International Conference on Biodegradable and Biobased Polymers—BIOPOL 2011 (2011).

International Search Report and Written Opinion daTED Oct. 2021, in PCT/US2021/043712.

* cited by examiner

MULTI-LAYERED PACKAGING FILMS

TECHNICAL FIELD

The present teachings relate generally to polymeric materials and multi-layered films formed therefrom. In some embodiments, the present teachings relate to biodegradable and/or compostable multi-layered polymeric films for use in packaging applications.

BACKGROUND

Snack food—including but not limited to potato chips, crackers, and cookies—is typically packaged in sealed disposable bags. Conventional bags may include multiple layers of polymeric films that are adhered or laminated together to provide a finished product having a desired combination of strength properties, barrier properties (e.g., with respect to moisture, oxygen, grease, and so forth), and good printability for product packaging graphics.

In the past, most or all of the film layers in conventional snack food bags have been composed primarily of petroleum-based polymers such as polyethylene (PE), polypropylene (PP), or polyethylene terephthalate (PET). While these polymers may provide good strength, barrier, and/or printability characteristics for the film structure, such polymers do not readily degrade or decompose after disposal—either in landfills or by home composting techniques. Thus, film structures and bags made from such polymers may subsist in landfills for centuries after disposal.

SUMMARY

The scope of the present invention is defined solely by the appended claims, and is not affected to any degree by the statements within this summary.

By way of introduction, a first multi-layered packaging film in accordance with the present teachings includes (a) an outer print layer, (b) an inner product-side layer that includes a core layer and a barrier layer, and (c) a lamination layer interposed between the outer print layer and the inner product-side layer. The outer print layer includes (i) polyhydroxyalkanoate (PHA), polylactide (PLA), polybutylene adipate terephthalate (PBAT), polybutyl succinate (PBS), cellophane, paper, or a combination thereof, (ii) a graphic element, and (iii) an optional first nucleating agent. The core layer includes PHA and a second nucleating agent.

A second multi-layered packaging film in accordance with the present teachings includes (a) an outer print layer, (b) an inner product-side layer, and (c) a lamination layer interposed between the outer print layer and the inner product-side layer. The outer print layer includes (i) PHA, PLA, PBAT, PBS, cellophane, paper or a combination thereof, (ii) a graphic element, and (iii) an optional first nucleating agent. The inner product-side layer includes (i) a barrier layer, (ii) a core layer, and (iii) a third layer interposed between the barrier layer and the core layer, wherein each of the core layer and the third layer includes PHA and a second nucleating agent. The lamination layer includes an adhesive, an extrusion lamination resin, or a combination thereof.

DETAILED DESCRIPTION

Figure 1:
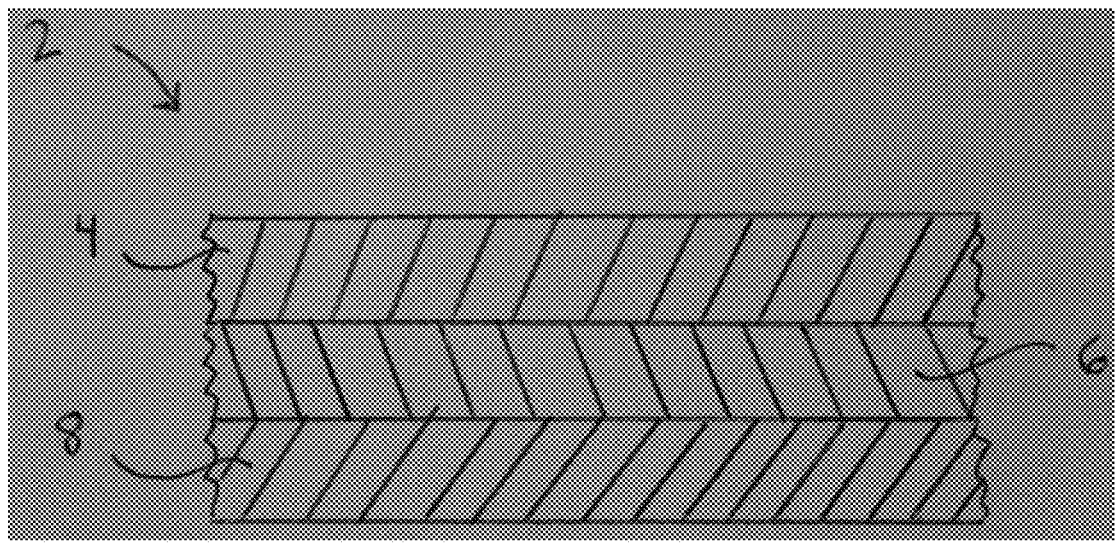
FIG. 1 shows a diagrammatic view of a first representative multi-layered packaging film in accordance with the present teachings.

Biodegradable multi-layered packaging film structures suitable for packaging chips and other snack foods have been discovered and are described herein. In some embodiments, the biodegradable multi-layer packaging films in accordance with the present teachings are at least partially compostable (and, in some embodiments, at least partially home compostable).

Throughout this description and in the appended claims, the following definitions are to be understood:

As used herein, the term "biodegradable" refers to a plastic or polymeric material that will undergo at least partial biodegradation by living organisms (microbes) in anaerobic and aerobic environments (as determined by ASTM D5511), in soil environments (as determined by ASTM D5988), in freshwater environments (as determined by ASTM D5271 (EN 29408)), or in marine environments (as determined by ASTM D6691). The biodegradability of biodegradable plastics can also be determined using ASTM D6868, ASTM D6400, and European EN 13432.

As used herein, the term "compostable" refers to a biodegradable material that may be broken down into only carbon dioxide, water, inorganic compounds, and/or biomass, which does not leave any visible or toxic residue. In some embodiments, a multi-layered packaging film in accordance with the present teachings is "compostable" as determined by ASTM D6400 for industrial or home compostability.

It is to be understood that elements and features of the various representative embodiments described below may be combined in different ways to produce new embodiments that likewise fall within the scope of the present teachings.

By way of general introduction, a multi-layered packaging film in accordance with the present teachings includes (a) an outer print layer, (b) an inner product-side layer, and (c) a lamination layer interposed between the outer print layer and the inner product-side layer. In some embodiments, the outer print layer includes a biopolymer and a graphic element, the inner product-side layer includes a core layer and a barrier layer, and the lamination layer includes an adhesive.

The polymeric materials used to form the outer print layer, inner product-side layer, and/or lamination layer of multi-layered packaging films in accordance with the present teachings may be present as homopolymers, copolymers, terpolymers, and/or blends thereof.

In some embodiments, the outer print layer includes (i) polyhydroxyalkanoate (PHA), polylactide (PLA), polybutylene adipate terephthalate (PBAT), polybutyl succinate (PBS), cellophane, paper, or a combination thereof, (ii) a graphic element, and (iii) an optional first nucleating agent. In some embodiments, the outer print layer further includes polybutylene succinate adipate (PBSA), polycaprolactone (PCL), or a combination thereof. In some embodiments—particularly though not exclusively embodiments in which one or more of the layers contains polyhydroxyalkanoate (PHA)—a nucleating agent may also be present. In some embodiments, the outer print layer comprises both PHA and the optional first nucleating agent. In some embodiments, the graphic element of the outer print layer includes text, an image, or a combination thereof.

In some embodiments, the lamination layer includes an adhesive which, in some embodiments, includes a compostable water-based adhesive, a compostable solvent-based adhesive, a compostable solvent-free adhesive, a non-compostable water-based adhesive, a non-compostable solvent-based adhesive, a non-compostable solvent-free adhesive, or a combination thereof. In some embodiments, the lamination layer comprises an extrusion lamination resin. Representative extrusion lamination resins for use in accordance with the present teachings include but are not limited to a PLA-based extrusion lamination resin, a PHA-based extrusion lamination resin, a PBSA-based extrusion lamination resin, a PBAT-based extrusion lamination resin, a PCL-based extrusion lamination resin, a starch-based extrusion lamination resin, or a combination thereof.

In some embodiments, the inner product-side layer includes (i) a core layer and (ii) a barrier layer. In other embodiments, the inner product-side layer further includes (iii) a sealant layer.

In some embodiments, the core layer of the inner product-side layer further includes a biodegradable polymer selected from the group consisting of PLA, PBS, PBSA, PGA, poly(lactic-co-glycolic acid) (PLGA), PBAT, and a combination thereof. In some embodiments, the core layer of the inner product-side layer includes PHA and a second nucleating agent. In some embodiments, the core layer of the inner product-side layer further includes PLA, PBSA, or a combination thereof. In some embodiments, the core layer of the inner product-side layer further includes PLA.

The second nucleating agent of the core layer and the optional first nucleating agent of the outer print layer may be the same or different. In some embodiments, each of the second nucleating agent and the optional first nucleating agent is independently selected from the group consisting of (1) compounds having an orthorhombic crystal structure, (2) compounds having a hexagonal crystal structure, (3) compounds having a tetragonal crystal structure, (4) allotrophic elements having at least one crystalline form which is orthorhombic, hexagonal, or tetragonal, (5) polymorphic compounds having at least one crystalline form which is orthorhombic, hexagonal, or tetragonal, and (6) a combination thereof. In some embodiments, each of the second nucleating agent and the optional first nucleating agent is independently selected from the group consisting of erythritols, pentaerythritol, dipentaerythritols, anatase, wulfenite, aragonite, artificial sweeteners, stearates, sorbitols, mannitols, inositols, polyester waxes, nanoclays, behenamide, erucamide, stearamide, oleamide, polyhydroxybutyrate, sulfur, selenium, phosphorous, benzamide, and a combination thereof.

In some embodiments, the core layer of the inner product-side layer further includes a filler selected from the group consisting of an inorganic filler, a bio-based filler, or a combination thereof. Representative inorganic fillers for use in accordance with the present teachings include but are not limited to alkali metal carbonates, alkaline earth metal carbonates, alkali metal sulfates, alkaline earth metal sulfates, or combinations thereof. In some embodiments, inorganic fillers for use in accordance with the present teachings are selected from the group consisting of sodium carbonate, calcium carbonate, magnesium carbonate, barium sulfate, magnesium sulfate, aluminum sulfate, magnesium oxide, calcium oxide, alumina, mica, talc, silica, clay, glass spheres, titanium dioxide, aluminum hydroxide, zeolites, and a combination thereof. In some embodiments, the inorganic filler includes calcium carbonate. Representative bio-based fillers for use in accordance with the present teachings include but are not limited to wheat straw, soy flakes, rice hulls, oat hulls, or a combination thereof.

In some embodiments, the inner product-side layer is formed via a process comprising co-extruding at least a first composition and a second composition, the first composition forming the core layer and the second composition forming the barrier layer. In some embodiments, the barrier layer of the inner product-side layer is provided as a coating whereas, in other embodiments, the barrier layer of the inner product-side layer is formed via a co-extrusion process. In some embodiments, the barrier layer includes metal (e.g., aluminum, aluminum oxide, or a combination thereof), micro-fibrillated cellulose, nano-fibrillated cellulose, nano-crystalline cellulose, graphene, water-based primer coating, solvent-based primer coating, polyurethane-based primer coating, polyacrylate-based primer coating, polyglycolide (PGA), phenoxy resins, magnetic nanoparticles, epoxy-microencapsulated amine, a silica deposition layer, or a combination thereof. In some embodiments, the barrier layer includes aluminum, aluminum oxide, or a combination thereof.

In some embodiments, the inner product-side layer further includes at least a third layer in addition to the core layer and the barrier layer, and the process by which the inner product-side layer is formed further includes coextruding at least a third composition, the third composition forming the third layer. In other embodiments, the inner product-side layer further includes at least a fourth layer, and the process by which the inner product-side layer is formed further includes coextruding at least a fourth composition, the fourth composition forming the fourth layer.

In some embodiments, the barrier layer of the inner-product side layer includes metal, and the inner-product side layer further includes a third layer interposed between the barrier layer and the core layer.

In some embodiments, the third layer of the inner-product side layer includes poly(vinyl alcohol) (PVA), modified cellulose acetate, polysaccharides, PGA, PHA, PLA, PBSA, PBS, or a combination thereof. In some embodiments, the third layer of the inner-product side layer includes PHA, PLA, or a combination thereof. In some embodiments, the third layer of the inner-product side layer includes PHA, PLA, or a combination thereof, and the core layer of the inner product-side layer further includes PLA.

In some embodiments, the barrier layer of the inner-product side layer includes metal, the inner product-side layer further includes a third layer and a fourth layer, and the core layer is interposed between the third layer and the fourth layer. In some embodiments, the fourth layer includes PVA, modified cellulose acetate, polysaccharides, PGA, PHA, PLA, PBSA, PBS, or a combination thereof. In some embodiments, the fourth layer includes PHA, PLA, or a combination thereof.

In some embodiments, the fourth layer includes a sealant layer and, in some embodiments, the sealant layer includes PHA, PLA, PBSA or a combination thereof. In other embodiments, the fourth layer includes a primer coating and, in some embodiments, the primer coating is interposed between the barrier layer and the third layer of the inner product-side layer. In some embodiments, the primer coating is water-based, in other embodiments the primer coating is solvent-based, in further embodiments, the primer coating is polyurethane-based, in further embodiments the primer coating is polyacrylate-based, in further embodiments the primer coating is polysaccharide-based, in further embodiments the primer coating is nanocellulose-based, in further embodiments the primer coating is polyglycolic acid (PGA)-based, and in further embodiments the primer coating is polyvinyl alcohol (PVOH)-based. In some embodiments, the fourth layer includes a silica deposition layer and, in some embodiments, the silica deposition layer is interposed between the barrier layer and the third layer. In some embodiments, the fourth layer includes an e-beam top coating and, in some embodiments, the e-beam top coating is interposed between the lamination layer and the barrier layer.

Packaging articles in accordance with the present teachings, which include but are not limited to food packages and beverage packages, contain a multi-layered packaging film of a type described herein.

In some embodiments, a portion of the film structure is formed and cut to provide a blank for a generally rectangular food packaging pouch or bag. A first set of generally parallel edges of the blank are overlapped and sealed along a seam to form a tube-like sleeve. A food product may be inserted into this sleeve and the ends of the sleeve may then be sealed to provide a final packaged food product. In some embodiments, this process may be automated by the use of a vertical or horizontal form, fill, and seal ("FFS") packaging machine. Food products which may be packaged according to the present disclosure include but are not limited to snack chips, such as potato chips, corn chips, pretzels, confections, and the like.

As is evident from the above description and as will be more fully described below in reference to FIGS. 1-12, a multi-layer food packaging film structure in accordance with the present teachings includes at least a barrier web and a print web. The barrier web skin layer is adhered or laminated to the print web by an adhesive layer or an extruded laminated layer disposed between the barrier web skin layer and print web.

In some embodiments, both the barrier web and the print web are biodegradable and/or compostable. More particularly each individual layer of the multi-layer film structure is biodegradable and/or compostable.

In some embodiments, the barrier web is made up of at least 3 film layers. For example, the barrier web may include at least a barrier web core layer having a first side and a second side, a barrier web skin layer adhered or laminated to the first side of the web core layer, and a packaging sealant layer adhered or laminated to the second side of the web core layer.

The composition of each individual layer of the barrier web may vary somewhat, as described below. In some embodiments, however, each individual layer of the barrier web is biodegradable and/or home compostable.

As noted above, the barrier web core layer is a film layer having a first side and a second side. The thickness of the core layer is from about 0.2 to about 2.0 mil.

The composition of the core layer includes at least two different biodegradable polymers, a nucleating agent, and a chain extender. Optionally, the core layer may also include a filler, a plasticizer, an antiblock agent, and/or an impact modifier.

In some embodiments, the barrier web core layer includes polyhydroxyalkanoates as a first biodegradable polymer. The core layer is generally made up of from about 10 weight percent to about 90 weight percent polyhydroxyalkanoates. In some embodiments, the core layer is made up of from about 30 weight percent to about 85 weight percent polyhydroxyalkanoates.

In some embodiments, the barrier web core layer also includes a second biodegradable polymer selected from the group consisting of polybutylene succinate, polybutylene succinate co butylene adipate, polylactic acid, cellulose acetate, and mixtures thereof. The amount of this second biodegradable polymer is from about 30 weight percent to about 90 weight percent of the core layer.

In some embodiments, the barrier web core layer may include from about 30 weight percent to about 70 weight percent polybutylene succinate, or from about 30 weight percent to about 70 weight percent polybutylene succinate co butylene adipate, or from about 10 weight percent to about 60 weight percent polylactic acid.

In some embodiments, the nucleating agent is present in the core layer in an amount from about from about 0.1 weight percent to about 5 weight percent. In some embodiments, the core layer nucleating agent may be selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and/or the like, and combinations thereof.

In some embodiments, the amount of the chain extender in the core layer is from about 0.01 weight percent to about 1.0 weight percent. Suitable chain extenders for the core layer include but are not limited to organic peroxy acids, inorganic peroxy acids, epoxy functionalized reagents, and/or the like, and combinations thereof.

In some embodiments, the core layer may also optionally include a filler material. Suitable materials for the filler are selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polyssacharides, aluminum hydroxide, magnesium hydroxide, chitin, and/or the like, and combinations thereof.

In some embodiments, the amount of filler in the barrier web core layer may be up to about 50 weight percent. In some embodiments, the core layer is made up of from about 5 weight percent to about 40 weight percent of the filler.

In some embodiments, the core layer may also include an optional plasticizer material as well. Suitable materials for the plasticizer include but are not limited to sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long chain alkyl acids, adipates, glycerol, isosorbide derivatives or mixtures thereof, HALLGREEN IM-8830 ester, HALL-GREEN R-8010 ester, polyhydroxyalkanoate copolymers comprising at least 18 mole percent monomer residues of hydroxyalkanoates other than hydroxybutyrate, and/or the like, and combinations thereof.

In some embodiments, the amount of plasticizer in the barrier web core layer may be up to about 50 weight percent. In some embodiments, the core layer is made up of from about 5 weight percent to about 15 weight percent of the plasticizer.

In some embodiments, the core layer may also include up to 20 weight percent of an impact modifier. In some embodiments, the core layer includes from about 5 weight percent to about 15 weight percent of the impact modifier.

Moreover, in some embodiments, the core layer may include up to 50 weight percent of one or more additives selected from the group consisting of polyvinyl alcohols, polyvinyl acetate, polyvinyl laureate, ethylene vinyl acetate, a butenediol vinyl alcohol copolymer sold under the tradename G-POLYMER by Mitsubishi), polybutylene adipate terephthalate (PBAT), the biodegradable and compostable polymer sold under the tradename ECOFLEX by BASF, poly(glycolic acid), polycaprolactone, furandicarboxylic acid-based polyesters, thermoplastic starch, cellulose, nano cellulose, glucans, and/or the like, and combinations thereof.

In some embodiments, the barrier web also includes a polymeric skin layer which is adhered or laminated to the first side of the web core layer. The thickness of the skin layer is from about 0.2 to about 2.0 mil. In some embodiments, the skin layer includes at least two different biodegradable polymers and a nucleating agent. In some embodiments, the barrier web skin layer includes polyhydroxyalkanoates as a first biodegradable polymer. In some embodiments, the skin layer is made up of from about 10 weight percent to about 90 weight percent polyhydroxyalkanoates. In some embodiments, the skin layer is made up of from about 40 weight percent to about 90 weight percent polyhydroxyalkanoates.

In some embodiments, the barrier web skin layer also includes a second biodegradable polymer selected from the group consisting of polybutylene succinate, polybutylene succinate co butylene adipate, polybutylene adipate co butylene terephalate, polycaprolactone, polylactic acid, polyglycolic acid, cellulose acetate, and mixtures thereof. In some embodiments, the amount of this second biodegradable polymer is from about 30 weight percent to about 90 weight percent of the core layer.

In some embodiments, the barrier web skin layer may include from about 40 weight percent to about 90 weight percent polybutylene succinate, or from about 40 weight percent to about 90 weight percent polybutylene succinate co butylene adipate, or from about 30 weight percent to about 70 weight percent polylactic acid.

In some embodiments, the skin layer nucleating agent is present in an amount from about from about 0.1 weight percent to about 5 weight percent. In some embodiments, the skin layer nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and/or the like, and combinations thereof.

In some embodiments, the barrier web further includes a sealant layer which is adhered or laminated to the second side of the web core layer. In some embodiments, the thickness of the sealant layer is from about 0.2 to about 2.0 mil. In some embodiments, the sealant layer includes at least one biodegradable polymer and a nucleating agent.

In some embodiments, the at least one biodegradable polymer in the sealant layer may be selected from the group polyhydroxyalkanoates, polybutylene succinate, polybutylene succinate co butylene adipate, polylactic acid, polycaprolactone, polyglycolic acid, polybutylene adipate co butylene terephalate, cellulose acetate, and/or the like, and combinations thereof. In some embodiments, the amount of the biodegradable polymer in the sealant layer is from about 30 weight percent to about 100 weight percent.

In some embodiments, the barrier web sealant layer may include from about 30 weight percent to about 100 weight percent polyhydroxyalkanoates, or from about 10 weight percent to about 100 weight percent polybutylene succinate, or from about 10 weight percent to about 100 weight percent polybutylene succinate co butylene adipate, or from about 10 weight percent to about 100 weight percent polylactic acid.

In some embodiments, the barrier web sealant layer also includes a nucleating agent which, in some embodiments, is present in an amount from about from about 0.1 weight percent to about 3 weight percent. In some embodiments, the sealant layer nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and/or the like, and combinations thereof.

In some embodiments, the sealant layer may also include from about 0.1 to about 4.0 weight percent of an antiblock agent, such as an amide material or large particle size filler.

In some embodiments, the individual layers of the barrier web may be joined together either by lamination or by the use of an adhesive. As used herein, an adhesive includes an aqueous and/or organic solvent which substantially evaporates over time, as well as tackifiers and other components. After the adhesive dries, only the non-solvent portions are left and serve to bind together the individual layers of the barrier web. By contrast, in lamination, an extruded polymer film, having little or no solvent, is disposed between two layers of the web to bind the layers together.

As noted above, a film structure in accordance with the present teachings also includes a print web. Like the barrier web, the print web, in some embodiments, is biodegradable and/or home compostable.

In some embodiments, the print web has a first side and a second side and desired packaging graphics may be printed on either side of the print web. Thus, the print web may be printed on the its outer side or it may be reverse printed on its inner side.

In some embodiments, the print web is made up of: (1) from about 10 weight percent to about 90 weight percent polyhydroxyalkanoates; (2) from about 30 weight percent to about 90 weight percent of at least one biodegradable polymer selected from the group consisting of polybutylene succinate, polybutylene succinate co butylene adipate, polybutylene adipate co butylene terephalate, polycaprolactone, polylactic acid, cellulose acetate, and mixtures thereof; (3) from about 0.1 weight percent to about 3 weight percent of a nucleating agent; and (4) optionally, up to about 15 weight percent of a plasticizer.

In some embodiments, the print web may include from about 30 weight percent to about 100 weight percent polyhydroxyalkanoates, or from about 30 weight percent to about 70 weight percent polybutylene succinate, or from about 30 weight percent to about 70 weight percent polybutylene succinate co butylene adipate, or from about 40 weight percent to about 70 weight percent polylactic acid. In some embodiments, the print web may include from 10 weight percent up to 100 weight percent cellulose acetate.

In some embodiments, a nucleating agent for the print web may be selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and/or the like, and combinations thereof.

In some embodiments, the print web may optionally further include from about 5 weight percent to about 30 weight percent of the plasticizer. Suitable plasticizers for the print web include but are not limited to sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly (ethylene) glycols having a number average molecular weight of 400-10,000 g/mol, esters of vegetable oils, long chain alkyl acids, adipates, glycerol, isosorbide derivatives or mixtures thereof, HALLGREEN IM-8830 ester, HALL-GREEN R-8010 ester, polyhydroxyalkanoate copolymers comprising at least 18 mole percent monomer residues of hydroxyalkanoates other than hydroxybutyrate, and/or the like, and combinations thereof.

In some embodiments, the barrier web skin layer is adhered or laminated to the print web by an adhesive layer or an extruded lamination layer disposed between the barrier web skin layer and print web.

Suitable adhesives may be either aqueous, organic solvent-based adhesives, or solvent-free adhesives (e.g., polyurethanes). Suitable lamination materials may be blends (including reactive blends) of biodegradable polymers. Representative biodegradable polymers for the extruded lamination include but are not limited to polycaprolactone and polybutylene adipate terephthalate (PBAT). In the lamination process, a polymeric resin is melted in an extruder and passes through a die that is sandwiched between the print web and the barrier web in order to bind the two webs together.

In each of the various layers described above, the polyhydroxyalkanoate polymer may be a homopolymer, made up only a single type of monomer residues. In some embodiments, the polyhydroxyalkanoate polymer is a copolymer, made up of two or more different type of monomer residues. In some embodiments, the polyhydroxyalkanoate polymer may be a terpolymer, made up of at least three different type of monomer residues.

For instance, in some embodiments, the at least one polyhydroxyalkanoate polymer is a copolymer made up of from about 75 to about 99.9 mole percent monomer residues of 3-hydroxybutyrate and from about 0.1 to about 25 mole percent monomer residues of a second 3-hydroxyalkanoate having from 5 to 12 carbon atoms.

In other embodiments, the at least one polyhydroxyalkanoate polymer is a terpolymer made up from about 75 to about 99.9 mole percent monomer residues of 3-hydroxybutyrate and from about 0.1 to about 25 mole percent monomer residues of 3-hydroxyhexanoate, and from about 0.1 to about 25 mole percent monomer residues of a third 3-hydroxyalkanoate having from 5 to 12 carbon atoms.

In some embodiments, the at least one polyhydroxyalkanoate polymer has a weight average molecular weight from about 50,000 Daltons to about 7.5 million Daltons, and in some embodiments has a weight average molecular weight from about 300,000 Daltons to about 3.0 million Daltons.

Representative configurations of exemplary multi-layered packaging films in accordance with the present teachings will now be described in reference to drawing FIGS. 1-12.

A first embodiment of a multi-layered packaging film 2 in accordance with the present teachings is shown in FIG. 1. The multi-layered packaging film 2 has, at a minimum, a three-layer structure that includes an outer print layer 4, an inner product-side layer 8, and a lamination layer 6 interposed between the outer print layer 4 and the inner product-side layer 8. The outer print layer 4 includes (i) polyhydroxyalkanoate (PHA), polylactide (PLA), polybutylene adipate terephthalate (PBAT), polybutyl succinate (PBS), cellophane, paper, or a combination thereof, (ii) a graphic element, and (iii) an optional first nucleating agent. The inner product-side layer 8 includes (i) a core layer and (ii) a barrier layer. The core layer includes PHA and a second nucleating agent.

Figure 2:
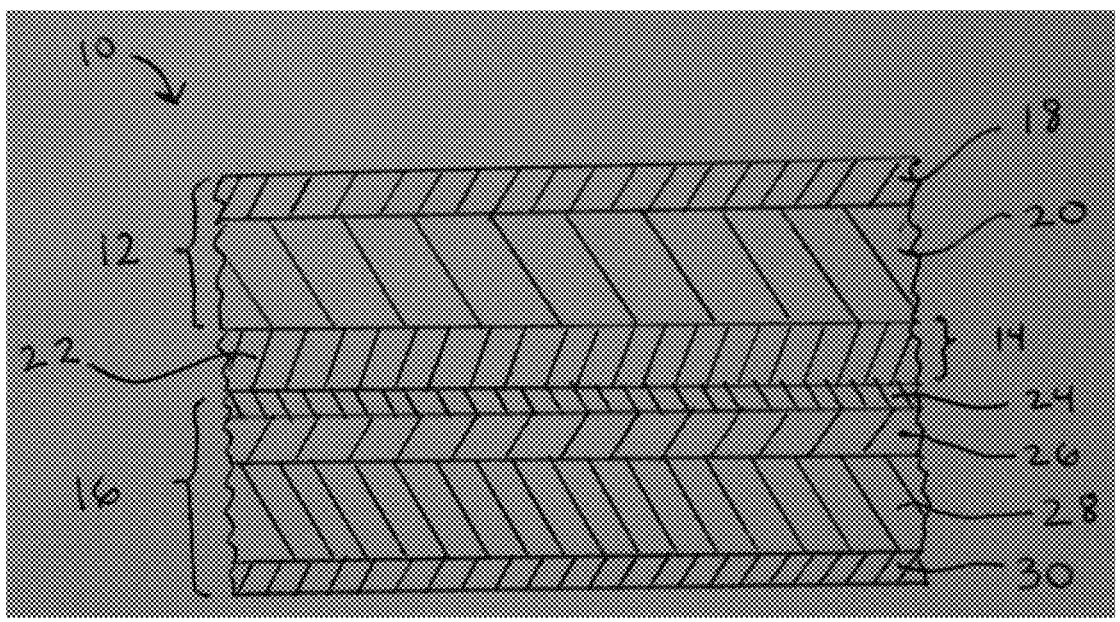
FIG. 2 shows a diagrammatic view of a second representative multi-layered packaging film in accordance with the present teachings.

A second embodiment of a multi-layered packaging film 10 in accordance with the present teachings is shown in FIG. 2. The multi-layered packaging film 10 has, at a minimum, a three-layer structure that includes an outer print layer 12, an inner product-side layer 16, and a lamination layer 14 interposed between the outer print layer 12 and the inner product-side layer 16. The outer print layer 12 includes a graphic element 18 and a biopolymer 20 (e.g., a PHA-containing blend). The lamination layer 14 includes an adhesive 22. The inner product-side layer 16 includes a barrier layer 24 (e.g., metal), a core layer 28 (e.g., a PHA/PLA blend), a third layer 26 (e.g., a PHA-containing skin), and a fourth layer 30 (e.g., a PHA-containing sealant layer).

Figure 3:
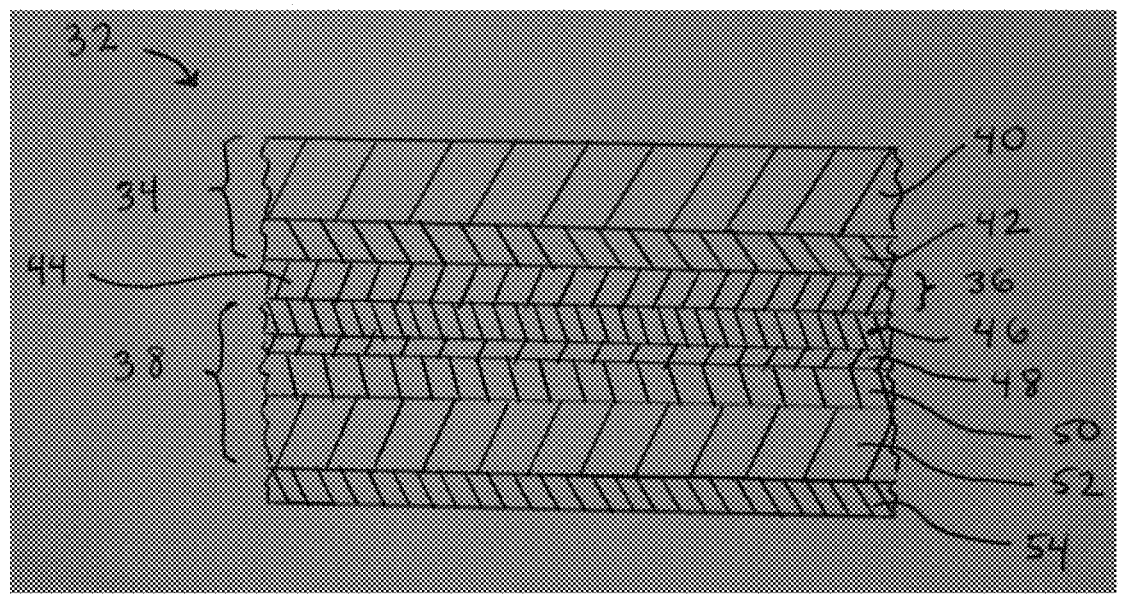
FIG. 3 shows a diagrammatic view of a third representative multi-layered packaging film in accordance with the present teachings.
Figure 4:
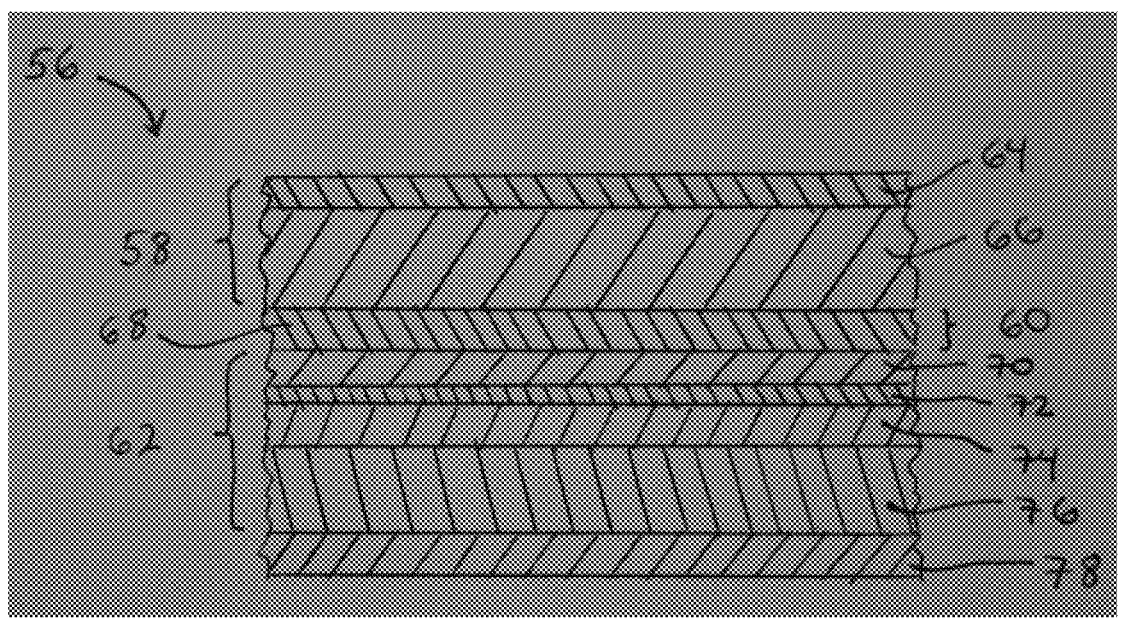
FIG. 4 shows a diagrammatic view of a fourth representative multi-layered packaging film in accordance with the present teachings.

A third embodiment of a multi-layered packaging film 32 in accordance with the present teachings is shown in FIG. 3. This embodiment corresponds to a bi-lam reverse-printed structure. The multi-layered packaging film 32 has, at a minimum, a three-layer structure that includes an outer print layer 34, an inner product-side layer 38, and a lamination layer 36 interposed between the outer print layer 34 and the inner product-side layer 38. The outer print layer 34 includes a clear film 40 (e.g., a PHA blend) and a reverse print 42. The lamination layer 36 includes an adhesive 44. The inner product-side layer 38 includes a barrier layer 46 (e.g., metal), a core layer 52 (e.g., a PHA/PLA blend), a third layer 50 (e.g., a PHA/PLA-containing skin), a fourth layer 54 (e.g., a PHA-containing sealant), and a primer coating layer 48.

A fourth embodiment of a multi-layered packaging film 56 in accordance with the present teachings is shown in FIG.

4. This embodiment corresponds to a bi-lam surface-printed structure. The multi-layered packaging film 56 has, at a minimum, a three-layer structure that includes an outer print layer 58, an inner product-side layer 62, and a lamination layer 60 interposed between the outer print layer 58 and the inner product-side layer 62. The outer print layer 58 includes a surface print 64 and an opaque film or paper (e.g., a PHA blend) 66. The multi-layered packaging film 56 shown in FIG. 4 differs from the multi-layered packaging film 32 shown in FIG. 3 in the configuration of their respective outer printer layers (58 and 34, respectively). The lamination layer 60 includes an adhesive 68. The inner product-side layer 62 includes a barrier layer 70 (e.g., metal), a core layer 76 (e.g., a PHA/PLA blend), a third layer 74 (e.g., a PHA/PLA-containing skin), a fourth layer 78 (e.g., a PHA-containing sealant), and a primer coating layer 72.

Figure 5:
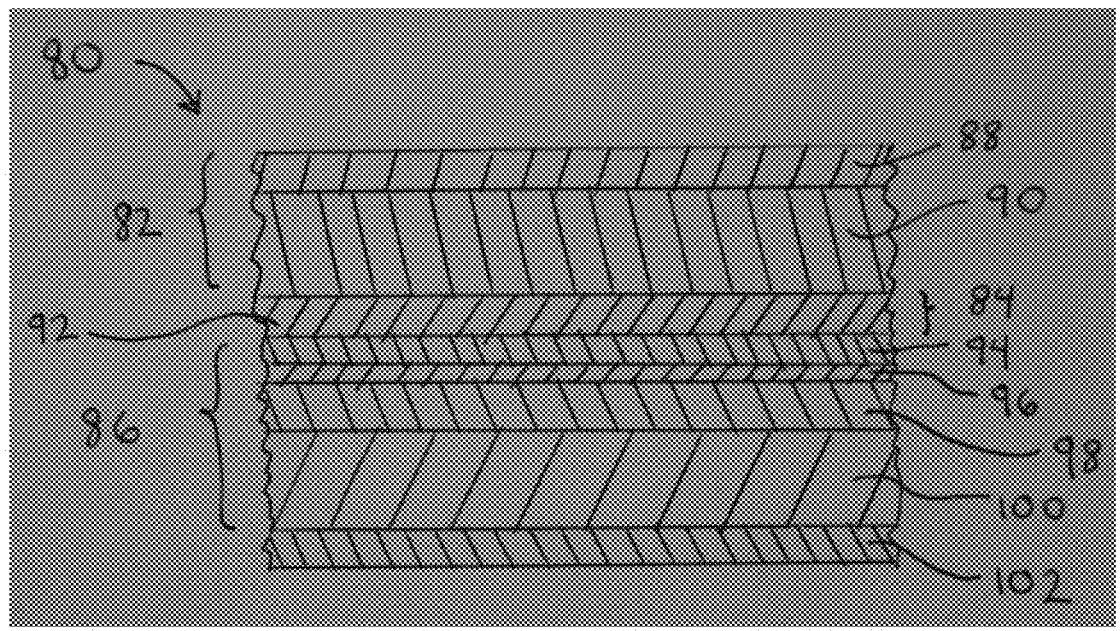
FIG. 5 shows a diagrammatic view of a fifth representative multi-layered packaging film in accordance with the present teachings.

A fifth embodiment of a multi-layered packaging film 80 in accordance with the present teachings is shown in FIG. 5. This embodiment corresponds to a bi-lam extrusion-laminated structure. The multi-layered packaging film 80 has, at a minimum, a three-layer structure that includes an outer print layer 82, an inner product-side layer 86, and a lamination layer 84 interposed between the outer print layer 82 and the inner product-side layer 86. The outer print layer 82 includes a print 88 and a biopolymer (e.g., a PHA blend) 90. The lamination layer 84 includes an extrusion lamination 92. The inner product-side layer 86 includes a barrier layer 94 (e.g., metal), a core layer 100 (e.g., a PHA/PLA blend), a third layer 98 (e.g., a PHA/PLA-containing skin), a fourth layer 102 (e.g., a PHA-containing sealant), and a primer coating layer 96.

A sixth embodiment of a multi-layered packaging film 80 in accordance with the present teachings is shown in FIG. 5. This embodiment corresponds to a bi-lam extrusion-laminated structure. The multi-layered packaging film 80 has, at a minimum, a three-layer structure that includes an outer print layer 82, an inner product-side layer 86, and a lamination layer 84 interposed between the outer print layer 82 and the inner product-side layer 86. The outer print layer 82 includes a print 88 and a biopolymer (e.g., a PHA blend) 90. The lamination layer 84 includes an extrusion lamination 92. The inner product-side layer 86 includes a barrier layer 94 (e.g., metal), a core layer 100 (e.g., a PHA/PLA blend), a third layer 98 (e.g., a PHA/PLA-containing skin), a fourth layer 102 (e.g., a PHA-containing sealant), and a primer coating layer 96.

Figure 6:
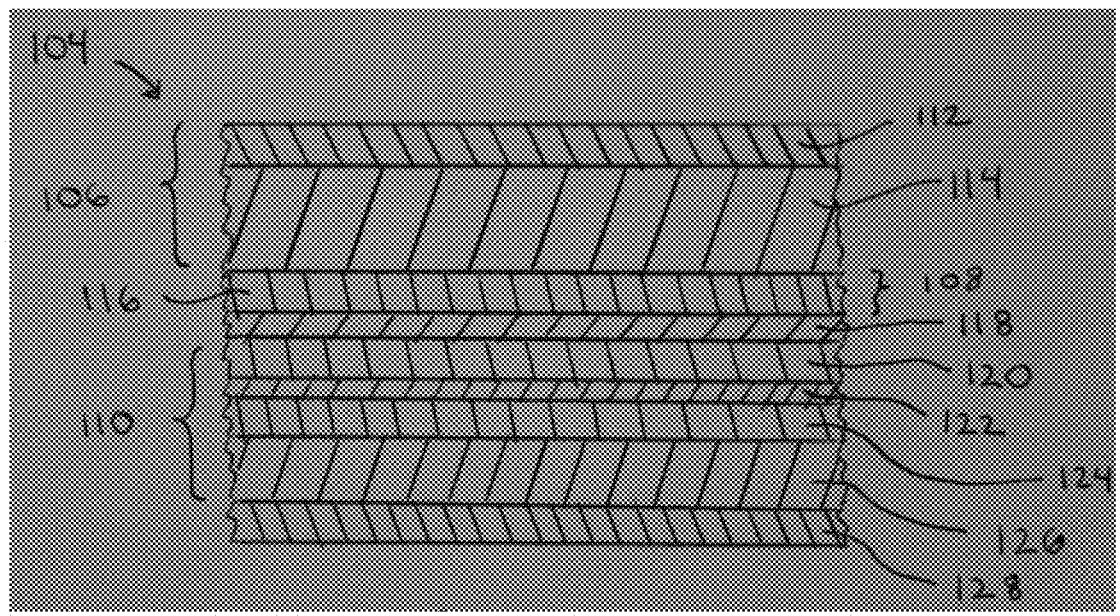
FIG. 6 shows a diagrammatic view of a sixth representative multi-layered packaging film in accordance with the present teachings.

A sixth embodiment of a multi-layered packaging film 104 in accordance with the present teachings is shown in FIG. 6. This embodiment corresponds to a bi-lam structure containing an e-beam topcoat over a metal. The multi-layered packaging film 104 has, at a minimum, a three-layer structure that includes an outer print layer 106, an inner product-side layer 110, and a lamination layer 108 interposed between the outer print layer 106 and the inner product-side layer 110. The outer print layer 106 includes a print 112 and a biopolymer (e.g., a PHA blend) 114. The lamination layer 108 includes an adhesive 116. The inner product-side layer 110 includes a barrier layer 120 (e.g., metal), a core layer 126 (e.g., a PHA/PLA blend), a third layer 124 (e.g., a PHA/PLA-containing skin), a fourth layer 128 (e.g., a PHA-containing sealant), a primer coating layer 122, and an e-beam top coat 118 interposed between the adhesive 116 and the barrier layer 120.

Figure 7:
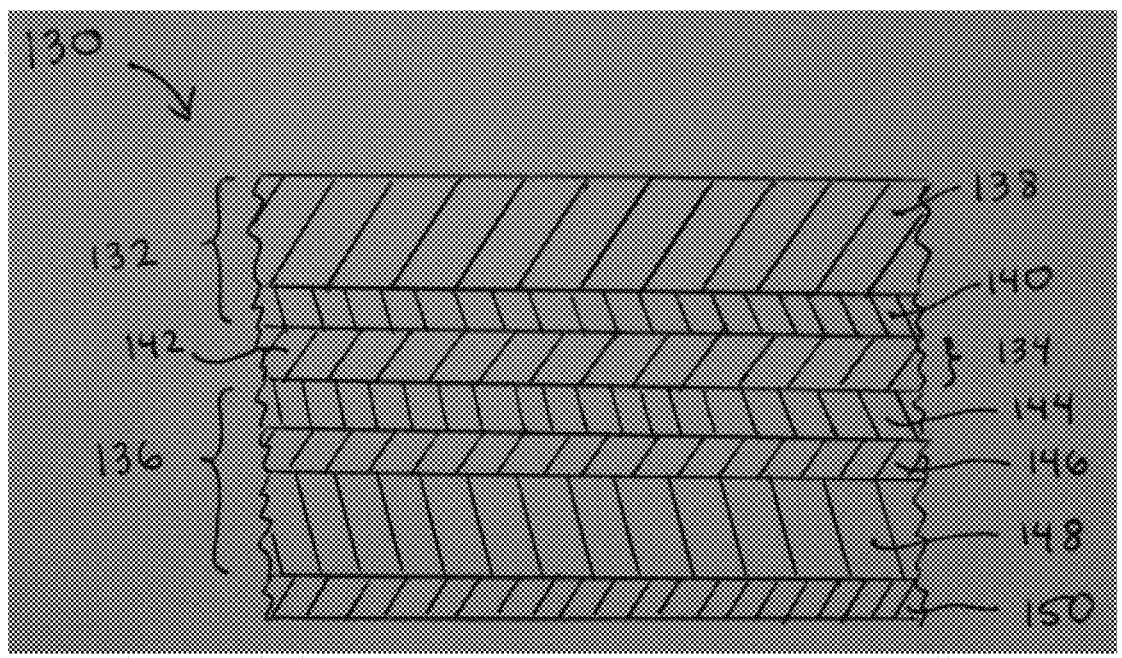
FIG. 7 shows a diagrammatic view of a seventh representative multi-layered packaging film in accordance with the present teachings.

A seventh embodiment of a multi-layered packaging film 130 in accordance with the present teachings is shown in FIG. 7. This embodiment corresponds to a bi-lam structure containing a barrier skin layer. The multi-layered packaging film 130 has, at a minimum, a three-layer structure that includes an outer print layer 132, an inner product-side layer 136, and a lamination layer 134 interposed between the outer print layer 132 and the inner product-side layer 136. The outer print layer 132 includes a clear film 138 (e.g., a PHA blend) and a reverse print 140. The lamination layer 134 includes an adhesive 142. The inner product-side layer 136 includes a barrier layer 146 (e.g., metal), a core layer 148 (e.g., a PHA blend), a third layer 146 (e.g., a barrier skin), and a fourth layer 150 (e.g., a PHA-containing sealant).

Figure 8:
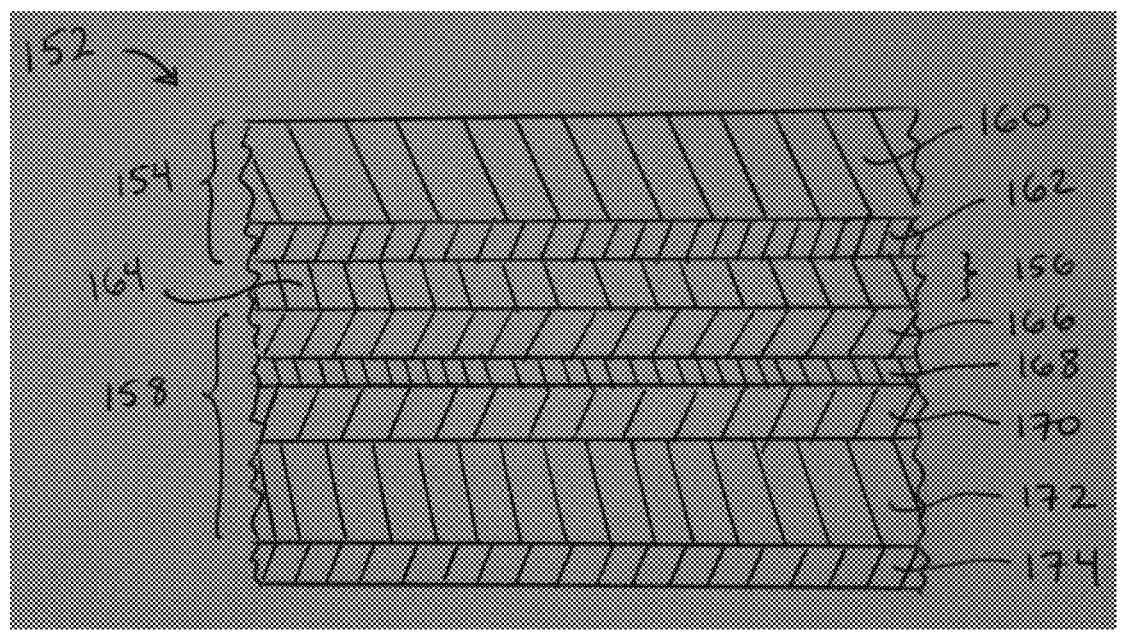
FIG. 8 shows a diagrammatic view of an eighth representative multi-layered packaging film in accordance with the present teachings.

An eighth embodiment of a multi-layered packaging film 152 in accordance with the present teachings is shown in FIG. 8. This embodiment corresponds to a bi-lam structure containing a silica primer layer. The multi-layered packaging film 152 has, at a minimum, a three-layer structure that includes an outer print layer 154, an inner product-side layer 158, and a lamination layer 156 interposed between the outer print layer 154 and the inner product-side layer 158. The outer print layer 154 includes a clear film 160 (e.g., a PHA blend) and a reverse print 162. The lamination layer 156 includes an adhesive 164. The inner product-side layer 158 includes a barrier layer 166 (e.g., metal), a core layer 172 (e.g., a PHA/PLA blend), a third layer 170 (e.g., a PHA/PLA-containing skin), a fourth layer 174 (e.g., a PHA-containing sealant), and a silica deposition layer 168.

Figure 9:
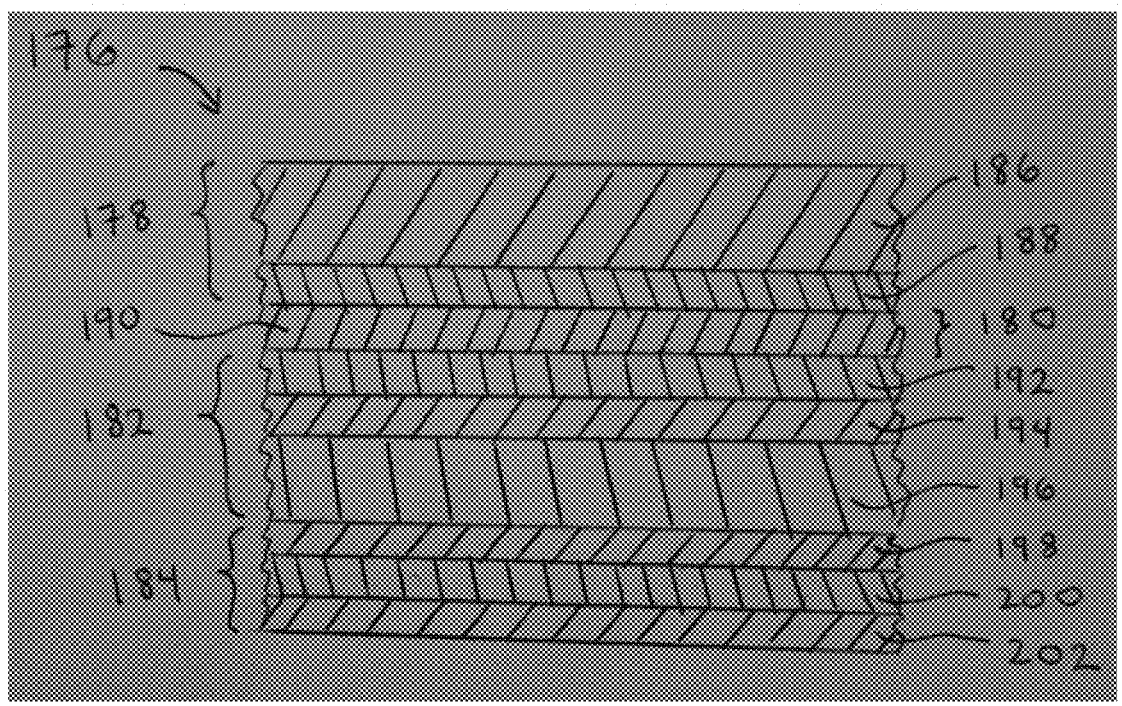
FIG. 9 shows a diagrammatic view of a ninth representative multi-layered packaging film in accordance with the present teachings.

A ninth embodiment of a multi-layered packaging film 176 in accordance with the present teachings is shown in FIG. 9. This embodiment corresponds to a tri-lam structure. The multi-layered packaging film 176 has, at a minimum, a four-layer structure that includes an outer print layer 178, an inner product-side layer 182, a lamination layer 180 interposed between the outer print layer 178 and the inner product-side layer 182, and a sealant film layer 184. The outer print layer 178 includes a clear film 186 (e.g., a PHA blend) and a reverse print 188. The lamination layer 180 includes an adhesive 190. In some embodiments, the lamination layer 180 is an extrusion lamination layer. The inner product-side layer 182 includes a barrier layer 192 (e.g., metal), a core layer 196 (e.g., a PHA blend), and a third layer 194 (e.g., a barrier skin). The sealant film layer 184 includes a sealant 198 (e.g., a PHA-containing sealant), a sealant film 202, and an adhesive 200 interposed between the sealant 198 and the sealant film 202.

Figure 10:
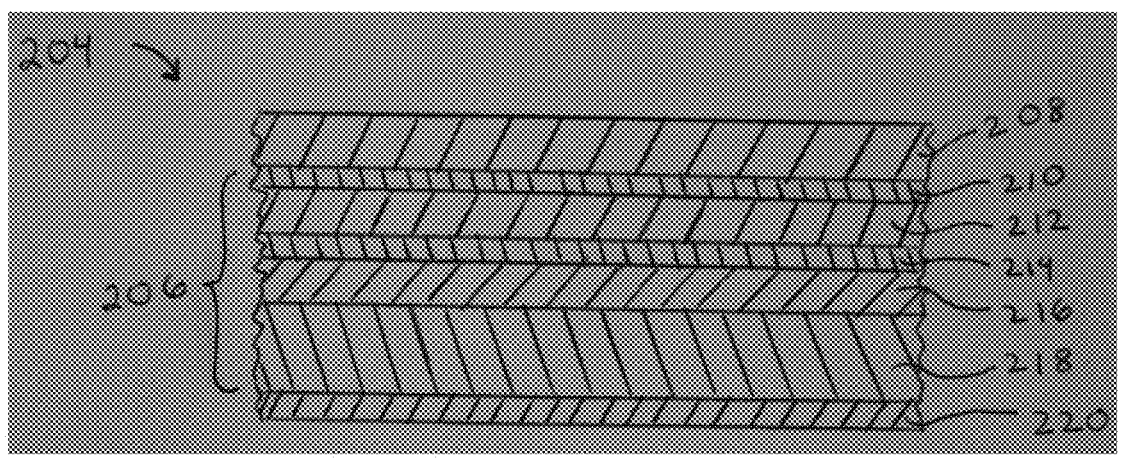
FIG. 10 shows a diagrammatic view of a tenth representative multi-layered packaging film in accordance with the present teachings.

A tenth embodiment of a multi-layered packaging film 204 in accordance with the present teachings is shown in FIG. 10. This embodiment corresponds to a mono-film structure. The multi-layered packaging film 204 has, at a minimum, a structure that includes a surface print 208 and an inner product-side layer 206. The inner product-side layer 206 includes a barrier layer 212 (e.g., metal), a core layer 218 (e.g., a PHA/PLA blend), a third layer 216 (e.g., a PHA/PLA skin), a sealant 220 (e.g., a PHA sealant), an e-beam topcoat 210, and a primer coating 214.

Figure 11:
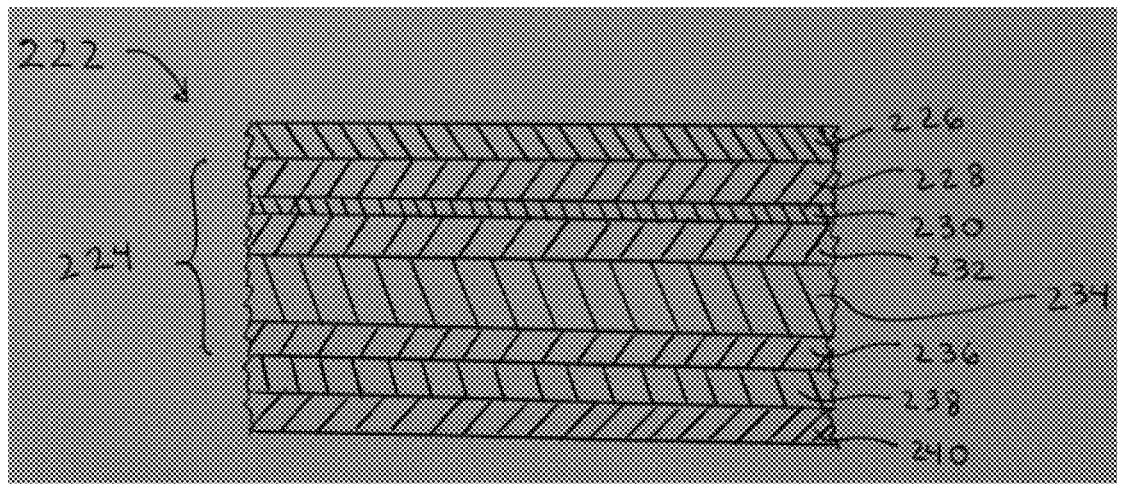
FIG. 11 shows a diagrammatic view of an eleventh representative multi-layered packaging film in accordance with the present teachings.

An eleventh embodiment of a multi-layered packaging film 222 in accordance with the present teachings is shown in FIG. 11. This embodiment corresponds to a bi-lam alternate structure. The multi-layered packaging film 222 has, at a minimum, a structure that includes a surface print 226, an inner product-side layer 224, and a sealant film layer 240. The inner product-side layer 224 includes a barrier layer 228 (e.g., metal), a core layer 234 (e.g., a PHA blend), a third layer 232 (e.g., a PHA-containing skin), a fourth layer 236 (e.g., a PHA-containing skin), and a primer coating 230 interposed between the barrier layer 228 and the third layer 232. An adhesive 238 is interposed between the fourth layer 236 and the sealant film layer 240.

Figure 12:
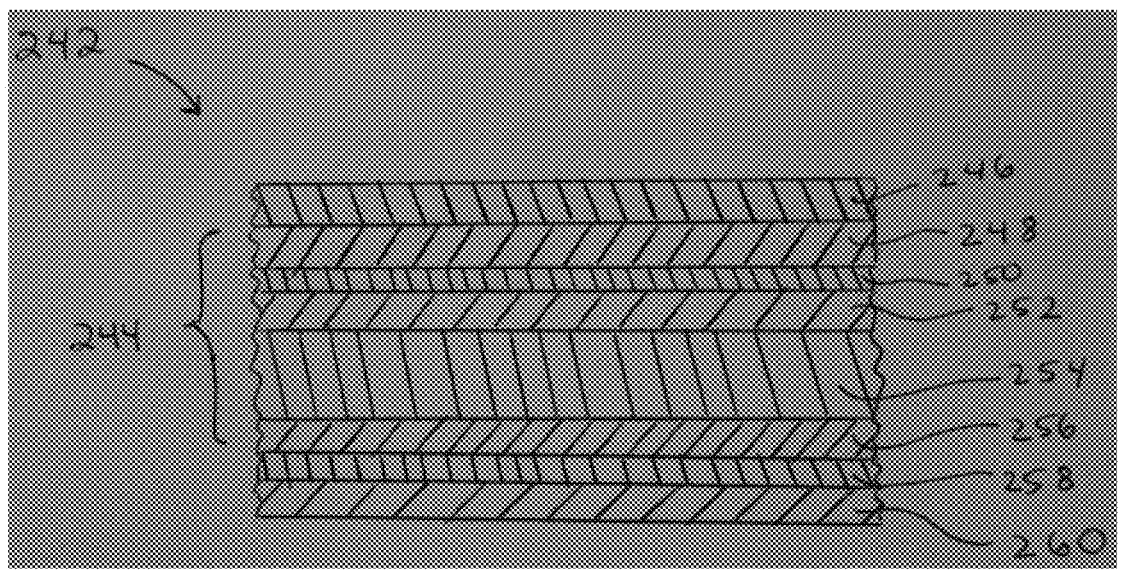
FIG. 12 shows a diagrammatic view of a twelfth representative multi-layered packaging film in accordance with the present teachings.

A twelfth embodiment of a multi-layered packaging film 242 in accordance with the present teachings is shown in FIG. 12. This embodiment corresponds to a bi-lam alternate structure. The multi-layered packaging film 242 has, at a minimum, a structure that includes a surface print 246, an inner product-side layer 244, and a sealant film layer 260. The inner product-side layer 244 includes a barrier layer 248 (e.g., metal), a core layer 254 (e.g., a PHA blend), a third layer 252 (e.g., a PHA blend-containing skin), a fourth layer 256 (e.g., a PHA blend-containing skin), and a primer coating 250 interposed between the barrier layer 248 and the third layer 252. An adhesive 258 is interposed between the fourth layer 256 and the sealant film layer 260.

Additional features and advantages of the present teachings can be described by the embodiments set forth in any of the following enumerated clauses. It is to be understood that any of the embodiments described herein can be used in connection with any other embodiments described herein to the extent that the embodiments do not contradict one another.

1. A multi-layered packaging film comprising: an outer print layer comprising (i) polyhydroxyalkanoate (PHA), polylactide (PLA), polybutylene adipate terephthalate (PBAT), polybutyl succinate (PBS), cellophane, paper, or a combination thereof, (ii) a graphic element, and (iii) an optional first nucleating agent; an inner product-side layer comprising (i) a core layer and (ii) a barrier layer; and a lamination layer interposed between the outer print layer and the inner product-side layer; wherein the core layer comprises PHA and a second nucleating agent.

2. The multi-layered packaging film of clause 1 wherein the outer print layer further comprises polybutylene succinate adipate (PBSA), polycaprolactone (PCL), or a combination thereof.

3. The multi-layered packaging film of any one of clauses 1-2 wherein the core layer further comprises a filler selected from the group consisting of an inorganic filler, a bio-based filler, or a combination thereof.

4. The multi-layered packaging film of any one of clauses 1-3 wherein the inorganic filler comprises an alkali metal carbonate, an alkaline earth metal carbonate, an alkali metal sulfate, an alkaline earth metal sulfate, or a combination thereof.

5. The multi-layered packaging film of any one of clauses 1-4 wherein the inorganic filler is selected from the group consisting of sodium carbonate, calcium carbonate, magnesium carbonate, barium sulfate, magnesium sulfate, aluminum sulfate, magnesium oxide, calcium oxide, alumina, mica, talc, silica, clay, glass spheres, titanium dioxide, aluminum hydroxide, zeolites, and a combination thereof.

6. The multi-layered packaging film of any one of clauses 1-5 wherein the inorganic filler comprises calcium carbonate.

7. The multi-layered packaging film of any one of clauses 1-6 wherein the bio-based filler comprises wheat straw, soy flakes, rice hulls, oat hulls, or a combination thereof.

8. The multi-layered packaging film of any one of clauses 1-7 wherein the lamination layer comprises an adhesive.

9. The multi-layered packaging film of any one of clauses 1-8 wherein the adhesive comprises a compostable water-based adhesive, a compostable solvent-based adhesive, a compostable solvent-free adhesive, a non-compostable water-based adhesive, a non-compostable solvent-based adhesive, a non-compostable solvent-free adhesive, or a combination thereof.

10. The multi-layered packaging film of any one of clauses 1-9 wherein the lamination layer comprises an extrusion lamination resin.

11. The multi-layered packaging film of any one of clauses 1-10 wherein the extrusion lamination resin comprises a PLA-based extrusion lamination resin, a PHA-based extrusion lamination resin, a PBSA-based extrusion lamination resin, a PBAT-based extrusion lamination resin, a PCL-based extrusion lamination resin, a starch-based extrusion lamination resin, or a combination thereof.

12. The multi-layered packaging film of any one of clauses 1-11 wherein the second nucleating agent and the optional first nucleating agent are the same or different.

13. The multi-layered packaging film of any one of clauses 1-12 wherein each of the second nucleating agent and the optional first nucleating agent is independently selected from the group consisting of (1) compounds having an orthorhombic crystal structure, (2) compounds having a hexagonal crystal structure, (3) compounds having a tetragonal crystal structure, (4) allotrophic elements having at least one crystalline form which is orthorhombic, hexagonal, or tetragonal, (5) polymorphic compounds having at least one crystalline form which is orthorhombic, hexagonal, or tetragonal, and (6) a combination thereof.

14. The multi-layered packaging film of any one of clauses 1-13 wherein each of the second nucleating agent and the optional first nucleating agent is independently selected from the group consisting of erythritols, pentaerythritol, dipentaerythritols, anatase, wulfenite, aragonite, artificial sweeteners, stearates, sorbitols, mannitols, inositols, polyester waxes, nanoclays, behenamide, erucamide, stearamide, oleamide, polyhydroxybutyrate, sulfur, selenium, phosphorous, benzamide, and a combination thereof.

15. The multi-layered packaging film of any one of clauses 1-14 wherein the outer print layer comprises PHA and the first nucleating agent.

16. The multi-layered packaging film of any one of clauses 1-15 wherein the inner product-side layer further comprises (iii) a sealant layer.

17. The multi-layered packaging film of any one of clauses 1-16 wherein the core layer further comprises PLA, PBSA, or a combination thereof.

18. The multi-layered packaging film of any one of clauses 1-17 wherein the barrier layer comprises metal, micro-fibrillated cellulose, nano-fibrillated cellulose, nano-crystalline cellulose, graphene, water-based primer coating, solvent-based primer coating, polyurethane-based primer coating, polyacrylate-based primer coating, polyglycolide (PGA), phenoxy resins, magnetic nanoparticles, epoxy-microencapsulated amine, a silica deposition layer, or a combination thereof.

19. The multi-layered packaging film of any one of clauses 1-18 wherein the metal comprises aluminum, aluminum oxide, or a combination thereof.

20. The multi-layered packaging film of any one of clauses 1-19 wherein the inner product-side layer is formed via a process comprising co-extruding at least a first composition and a second composition, the first composition forming the core layer and the second composition forming the barrier layer.

21. The multi-layered packaging film of any one of clauses 1-20 wherein the inner product-side layer further comprises at least a third layer, and wherein the process further comprises coextruding at least a third composition, the third composition forming the third layer.

22. The multi-layered packaging film of any one of clauses 1-21 wherein the inner product-side layer further comprises at least a fourth layer, and wherein the process further comprises coextruding at least a fourth composition, the fourth composition forming the fourth layer.

23. The multi-layered packaging film of any one of clauses 1-22 wherein the barrier layer comprises metal, and wherein the inner-product side layer further comprises a third layer interposed between the barrier layer and the core layer.

24. The multi-layered packaging film of any one of clauses 1-23 wherein the core layer further comprises a biodegradable polymer selected from the group consisting of PLA, PBS, PBSA, PGA, poly(lactic-co-glycolic acid) (PLGA), PBAT, and a combination thereof.

25. The multi-layered packaging film of any one of clauses 1-24 wherein the core layer further comprises PLA.

26. The multi-layered packaging film of any one of clauses 1-25 wherein the third layer comprises poly(vinyl alcohol) (PVA), modified cellulose acetate, polysaccharides, PGA, PHA, PLA, PBSA, PBS, or a combination thereof.

27. The multi-layered packaging film of any one of clauses 1-26 wherein the third layer comprises PHA, PLA, or a combination thereof.

28. The multi-layered packaging film of any one of clauses 1-27 wherein the third layer comprises PHA, PLA, or a combination thereof, and wherein the core layer further comprises PLA.

29. The multi-layered packaging film of any one of clauses 1-28 wherein the barrier layer comprises metal, wherein the inner product-side layer further comprises a third layer and a fourth layer, and wherein the core layer is interposed between the third layer and the fourth layer.

30. The multi-layered packaging film of any one of clauses 1-29 wherein the fourth layer is a sealant layer.

31. The multi-layered packaging film of any one of clauses 1-30 wherein the sealant layer comprises PHA, PLA, PBSA or a combination thereof.

32. The multi-layered packaging film of any one of clauses 1-31 wherein the inner product-side barrier layer further comprises a fourth layer, and wherein the fourth layer comprises a primer coating.

33. The multi-layered packaging film of any one of clauses 1-32 wherein the primer coating is interposed between the barrier layer and the third layer.

34. The multi-layered packaging film of any one of clauses 1-33 wherein the primer coating is water-based.

35. The multi-layered packaging film of any one of clauses 1-33 wherein the primer coating is solvent-based.

36. The multi-layered packaging film of any one of clauses 1-33 wherein the primer coating is polyurethane-based.

37. The multi-layered packaging film of any one of clauses 1-34 wherein the primer coating is polyacrylate-based.

38. The multi-layered packaging film of any one of clauses 1-37 wherein the inner product-side layer further comprises a fourth layer, and wherein the fourth layer comprises a silica deposition layer.

39. The multi-layered packaging film of any one of clauses 1-38 wherein the silica deposition layer is interposed between the barrier layer and the third layer.

40. The multi-layered packaging film of any one of clauses 1-39 wherein the inner product-side layer further comprises a fourth layer, and wherein the core layer is interposed between the third layer and the fourth layer.

41. The multi-layered packaging film of any one of clauses 1-40 wherein the fourth layer comprises PVA, modified cellulose acetate, polysaccharides, PGA, PHA, PLA, PBSA, PBS, or a combination thereof.

42. The multi-layered packaging film of any one of clauses 1-41 wherein the fourth layer comprises PHA, PLA, or a combination thereof.

43. The multi-layered packaging film of any one of clauses 1-42 wherein the inner product-side layer further comprises a fourth layer, wherein the fourth layer comprises an e-beam top coating, and wherein the e-beam top coating is interposed between the lamination layer and the barrier layer.

44. The multi-layered packaging film of any one of clauses 1-43 wherein the metal comprises aluminum, aluminum oxide, or a combination thereof.

45. The multi-layered packaging film of of any one of clauses 1-44 wherein the graphic element comprises text, an image, or a combination thereof.

46. A multi-layered packaging film comprising: an outer print layer comprising (i) PHA, PLA, PBAT, PBS, cellophane, paper or a combination thereof, (ii) a graphic element, and (iii) an optional first nucleating agent; an inner product-side layer comprising (i) a barrier layer, (ii) a core layer, and (iii) a third layer interposed between the barrier layer and the core layer, wherein each of the core layer and the third layer comprises PHA and a second nucleating agent; and a lamination layer comprising an adhesive, an extrusion lamination resin, or a combination thereof, wherein the lamination layer is interposed between the outer print layer and the inner product-side layer.

47. The multi-layered packaging film of clause 46 wherein the core layer and/or the third layer independently further comprises a filler selected from the group consisting of mineral fillers, bio-based fillers, and a combination thereof.

48. The multi-layered packaging film of any one of clauses 46-47 wherein the core layer further comprises a biodegradable polymer selected from the group consisting of PLA, PBS, PBSA, PGA, PLGA, PBAT, and a combination thereof.

49. A packaging article comprising the multi-layered packaging film of any one of clauses 1-48.

50. The packaging article of clause 49 wherein the packaging article is a food package.

51. The packaging article of clause 49 wherein the packaging article is a snack food package.

52. The packaging article of clause 49 wherein the packaging article is a beverage package.

53. A multi-layer food packaging film structure comprising: a biodegradable barrier web comprising a barrier web core layer having a first side and a second side, a barrier web skin layer adhered or laminated to the first side of the web core layer, and a packaging sealant layer adhered or laminated to the second side of the web core layer; and a biodegradable print web having a first side and a second side and ink printed onto at least one of the print web first and second side, the print web comprising: (1) from about 10 weight percent to about 90 weight percent polyhydroxyalkanoates; (2) from about 30 weight percent to about 90 weight percent of at least one biodegradable polymer selected from the group consisting of polybutylene succinate, polybutylene succinate co butylene adipate, polybutylene adipate co butylene terephalate, polycaprolactone, polylactic acid, cellulose acetate, and mixtures thereof; (3) from about 0.1 weight percent to about 5 weight percent of a nucleating agent; and (4) optionally, up to about 15 weight percent of a plasticizer; wherein the barrier web skin layer is adhered or laminated to the print web by an adhesive layer or an extruded lamination layer disposed between the barrier web skin layer and print web.

54. The film structure of clause 53, wherein the barrier web skin layer comprises (1) from about 10 weight percent to about 90 weight percent polyhydroxyalkanoates; (2) from about 30 weight percent to about 90 weight percent of at least one biodegradable polymer selected from the group consisting of polybutylene succinate, polybutylene succinate co butylene adipate, polybutylene adipate co butylene terephalate, polycaprolactone, polylactic acid, polyglycolic acid, cellulose acetate, and mixtures thereof; and (3) from about 0.1 weight percent to about 5 weight percent of a nucleating agent.

55. The film structure of clause 54, wherein the skin layer comprises from about 40 weight percent to about 90 weight percent polyhydroxyalkanoates.

56. The film structure of clause 54, wherein the skin layer comprises from about 40 weight percent to about 90 weight percent.

57. The film structure of clause 54, wherein the skin layer comprises from about 40 weight percent to about 90 weight percent polybutylene succinate co butylene adipate.

58. The film structure of clause 54, wherein the skin layer comprises from about 30 weight percent to about 70 weight percent polylactic acid.

59. The film structure of clause 54, wherein the skin layer nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and mixtures thereof.

60. The film structure of clause 53, wherein the barrier web core layer comprises: (1) from about 10 weight percent to about 90 weight percent polyhydroxyalkanoates; (2) from about 30 weight percent to about 90 weight percent of at least one biodegradable polymer selected from the group consisting of polybutylene succinate, polybutylene succinate adipate, polylactic acid, cellulose acetate, and mixtures thereof; (3) from about 0.1 weight percent to about 5 weight percent of a nucleating agent; (4) from about 0.01 weight percent to about 1.0 weight percent of a chain extender; (5) optionally, up to about 50 weight percent of a filler; (5) optionally, up to about 15 weight percent of a plasticizer; and (6) optionally, up to about 20 weight percent of an impact modifier.

61. The film structure of clause 60, wherein the core layer comprises from about 30 weight percent to about 85 weight percent polyhydroxyalkanoates.

62. The film structure of clause 60, wherein the core layer comprises from about 30 weight percent to about 70 weight percent polybutylene succinate.

63. The film structure of clause 60, wherein the core layer comprises from about 30 weight percent to about 70 weight percent polybutylene succinate co butylene adipate.

64. The film structure of clause 60, wherein the core layer comprises from about 10 weight percent to about 60 weight percent polylactic acid.

65. The film structure of clause 60, wherein the core layer nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate and mixtures thereof.

66. The film structure of clause 60, wherein the core layer filler is selected from group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polyssacharides, aluminum hydroxide, magnesium hydroxide, chitin, and mixtures thereof.

67. The film structure of clause 60, wherein the core layer comprises from about 5 weight percent to about 40 weight percent of the filler.

68. The film structure of clause 8, wherein the core layer comprises from about 5 weight percent to about 30 weight percent of the plasticizer.

69. The film structure of clause 60, wherein the core layer comprises a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long chain alkyl acids, adipates, glycerol, isosorbide derivatives or mixtures thereof, HALLGREEN IM-8830 ester, HALLGREEN R-8010 ester, polyhydroxyalkanoate copolymers comprising at least 18 mole percent monomer residues of hydroxyalkanoates other than hydroxybutyrate, and mixtures thereof.

70. The film structure of clause 60, wherein the core layer comprises a chain extender selected from the group consisting of organic peroxy acids, inorganic peroxy acids, epoxy functionalized reagents, or mixtures thereof.

71. The film structure of clause 60, wherein the core layer comprises from about 5 weight percent to about 15 weight percent of the impact modifier.

72. The film structure of clause 60, wherein the core layer further comprises up to 50 weight percent of one or more additives selected from the group consisting of polyvinyl alcohols, polyvinyl acetate, polyvinyl laureate, ethylene vinyl acetate, G-POLYMER, polybutylene adipate terephthalate (PBAT), Ecoflex, poly (glycolic acid), polycaprolactone, Furandicarboxylic acid based polyesters, thermoplastic starch, Cellulose, nano cellulose, glucans, and mixtures thereof.

73. The film structure of clause 53, wherein the barrier web sealant layer comprises: (1) from about 30 weight percent to about 100 weight percent of at least one at least one biodegradable polymer selected from the group consisting of polyhydroxyalkanoates, polybutylene succinate, polybutylene succinate co butylene adipate, polylactic acid, polycaprolactone, polyglycolic acid, polybutylene adipate co butylene terephalate, cellulose acetate, and mixtures thereof; and (2) from about 0.1 weight percent to about 5 weight percent of a nucleating agent.

74. The film structure of clause 73, wherein the sealant layer comprises from about 30 weight percent to about 90 weight percent polyhydroxyalkanoates.

75. The film structure of clause 73, wherein the sealant layer comprises from about 10 weight percent to about 100 weight percent polybutylene succinate.

76. The film structure of clause 73, wherein the sealant layer comprises from about 10 weight percent to about 100 weight percent polybutylene succinate co butylene adipate.

77. The film structure of clause 73, wherein the sealant layer comprises from about 10 weight percent to about 100 weight percent polylactic acid.

78. The film structure of clause 73, wherein the sealant layer nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and mixtures thereof.

79. The film structure of clause 53, wherein the print web comprises (1) from about 10 weight percent to about 90 weight percent polyhydroxyalkanoates; (2) from about 30 weight percent to about 70 weight percent of at least one biodegradable polymer selected from the group consisting of polybutylene succinate, polybutylene succinate co butylene adipate, polylactic acid, polycaprolactone, polyglycolic acid, polybutylene adipate co butylene terephalate, cellulose acetate, and mixtures thereof; (3) from about 0.1 weight percent to about 5 weight percent of a nucleating agent; and (4) optionally, up to about 50 weight percent of a plasticizer.

80. The film structure of clause 79, wherein the print web comprises from about 30 weight percent to about 70 weight percent polyhydroxyalkanoates.

81. The film structure of clause 79, wherein the print web from about 30 weight percent to about 70 weight percent polybutylene succinate.

82. The film structure of clause 79, wherein the print web comprises from about 30 weight percent to about 70 weight percent polybutylene succinate co butylene adipate.

83. The film structure of clause 79, wherein the print web comprises from about 40 weight percent to about 70 weight percent polylactic acid.

84. The film structure of clause 79, wherein the print web nucleating agent is selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, polyhydroxybutyrate, and mixtures thereof.

85. The film structure of clause 79, wherein the print web comprises from about 5 weight percent to about 30 weight percent of the plasticizer.

86. The film structure of clause 79, wherein the print web plasticizer is selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long chain alkyl acids, adipates, glycerol, isosorbide derivatives or mixtures thereof, HALLGREEN IM-8830 ester, HALLGREEN R-8010 ester, polyhydroxyalkanoate copolymers comprising at least 18 mole percent monomer residues of hydroxyalkanoates other than hydroxybutyrate, and mixtures thereof.

It is to be understood that use of the indefinite articles "a" and "an" in reference to an element (e.g., "an outer print layer," "an inner product-side layer," "a core layer," "a barrier layer," "a lamination layer," etc.) does not exclude the presence, in some embodiments, of a plurality of such elements.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A multi-layered packaging film comprising:
an outer print layer comprising (i) polyhydroxyalkanoate (PHA) and a first nucleating agent, (ii) a material selected from polylactide (PLA), polybutylene adipate terephthalate (PBAT), polybutyl succinate (PBS), cellophane, paper, or a combination thereof, and (iii) a graphic element;
an inner product-side layer comprising (i) a core layer comprising PHA, a second nucleating agent, and a biodegradable polymer selected from PLA, PBS, polybutylene succinate adipate (PBSA), polyglycolic acid (PGA), poly(lactic-co-glycolic acid) (PLGA), PBAT, and a combination thereof and (ii) a barrier layer comprising metal, micro-fibrillated cellulose, nano-fibrillated cellulose, nano-crystalline cellulose, graphene, water-based primer coating, solvent-based primer coating, polyurethane-based primer coating, polyacrylate-based primer coating, PGA, phenoxy resins, magnetic nanoparticles, epoxy-microencapsulated amine, a silica deposition layer, or a combination thereof; and
a lamination layer comprising an adhesive or an extrusion lamination resin interposed between the outer print layer and the inner product-side layer;
wherein each of the first nucleating agent and the second nucleating agent is independently selected from the group consisting of erythritols, pentaerythritol, dipentaerythritols, anatase, wulfenite, aragonite, artificial sweeteners, stearates, mannitols, inositols, polyester waxes, nanoclays, behenamide, erucamide, stearamide, oleamide, polyhydroxybutyrate, sulfur, selenium, phosphorous, benzamide, and a combination thereof.

2. The multi-layered packaging film of claim 1 wherein the outer print layer further comprises polybutylene succinate adipate (PBSA), polycaprolactone (PCL), or a combination thereof.

3. The multi-layered packaging film of claim 1 wherein the core layer further comprises a filler selected from the group consisting of an inorganic filler, a bio-based filler, or a combination thereof.

4. The multi-layered packaging film of claim 3 wherein the inorganic filler comprises an alkali metal carbonate, an alkaline earth metal carbonate, an alkali metal sulfate, an alkaline earth metal sulfate, or a combination thereof.

5. The multi-layered packaging film of claim 3 wherein the inorganic filler is selected from the group consisting of sodium carbonate, calcium carbonate, magnesium carbonate, barium sulfate, magnesium sulfate, aluminum sulfate, magnesium oxide, calcium oxide, alumina, mica, talc, silica, clay, glass spheres, titanium dioxide, aluminum hydroxide, zeolites, and a combination thereof.

6. The multi-layered packaging film of claim 3 wherein the inorganic filler comprises calcium carbonate.

7. The multi-layered packaging film of claim 3 wherein the bio-based filler comprises wheat straw, soy flakes, rice hulls, oat hulls, or a combination thereof.

8. The multi-layered packaging film of claim 1 wherein the lamination layer comprises an adhesive.

9. The multi-layered packaging film of claim 8 wherein the adhesive comprises a compostable water-based adhesive, a compostable solvent-based adhesive, or a compostable solvent-free adhesive.

10. The multi-layered packaging film of claim 1 wherein the lamination layer comprises an extrusion lamination resin.

11. The multi-layered packaging film of claim 10 wherein the extrusion lamination resin comprises a PLA-based extrusion lamination resin, a PHA-based extrusion lamination resin, a PBSA-based extrusion lamination resin, a PBAT-based extrusion lamination resin, a PCL-based extrusion lamination resin, a starch-based extrusion lamination resin, or a combination thereof.

12. The multi-layered packaging film of claim 1 wherein the first nucleating agent and the second nucleating agent are the same or different.

13. The multi-layered packaging film of claim 1 wherein the inner product-side layer further comprises (iii) a sealant layer.

14. The multi-layered packaging film of claim 1 wherein the core layer further comprises PLA, PBSA, or a combination thereof.

15. The multi-layered packaging film of claim 1 wherein the metal comprises aluminum, aluminum oxide, or a combination thereof.

16. The multi-layered packaging film of claim 1 wherein the inner product-side layer is formed via a process comprising co-extruding at least a first composition and a second composition, the first composition forming the core layer and the second composition forming the barrier layer.

17. The multi-layered packaging film of claim 16 wherein the inner product-side layer further comprises at least a third layer, and wherein the process further comprises coextruding at least a third composition, the third composition forming the third layer.

18. The multi-layered packaging film of claim 17 wherein the inner product-side layer further comprises at least a fourth layer, and wherein the process further comprises coextruding at least a fourth composition, the fourth composition forming the fourth layer.

19. The multi-layered packaging film of claim 1 wherein the barrier layer comprises metal, and wherein the inner-product side layer further comprises a third layer interposed between the barrier layer and the core layer.

20. The multi-layered packaging film of claim 19 wherein the core layer further comprises PLA.

21. The multi-layered packaging film of claim 19 wherein the third layer comprises poly(vinyl alcohol) (PVA), modified cellulose acetate, polysaccharides, PGA, PHA, PLA, PBSA, PBS, or a combination thereof.

22. The multi-layered packaging film of claim 19 wherein the third layer comprises PHA, PLA, or a combination thereof.

23. The multi-layered packaging film of claim 19 wherein the third layer comprises PHA, PLA, or a combination thereof, and wherein the core layer further comprises PLA.

24. The multi-layered packaging film of claim 19 wherein the barrier layer comprises metal, wherein the inner product-side layer further comprises a third layer and a fourth layer, and wherein the core layer is interposed between the third layer and the fourth layer.

25. The multi-layered packaging film of claim 24 wherein the fourth layer is a sealant layer.

26. The multi-layered packaging film of claim 25 wherein the sealant layer comprises PHA, PLA, PBSA or a combination thereof.

27. The multi-layered packaging film of claim 19 wherein the inner product-side barrier layer further comprises a fourth layer, and wherein the fourth layer comprises a primer coating.

28. The multi-layered packaging film of claim 27 wherein the primer coating is interposed between the barrier layer and the third layer.

29. The multi-layered packaging film of claim 27 wherein the primer coating is water-based.

30. The multi-layered packaging film of claim 27 wherein the primer coating is solvent-based.

31. The multi-layered packaging film of claim 27 wherein the primer coating is polyurethane-based.

32. The multi-layered packaging film of claim 27 wherein the primer coating is polyacrylate-based.

33. The multi-layered packaging film of claim 19 wherein the inner product-side layer further comprises a fourth layer, and wherein the fourth layer comprises a silica deposition layer.

34. The multi-layered packaging film of claim 33 wherein the silica deposition layer is interposed between the barrier layer and the third layer.

35. The multi-layered packaging film of claim 19 wherein the inner product-side layer further comprises a fourth layer, and wherein the core layer is interposed between the third layer and the fourth layer.

36. The multi-layered packaging film of claim 35 wherein the fourth layer comprises PVA, modified cellulose acetate, polysaccharides, PGA, PHA, PLA, PBSA, PBS, or a combination thereof.

37. The multi-layered packaging film of claim 35 wherein the fourth layer comprises PHA, PLA, or a combination thereof.

38. The multi-layered packaging film of claim 19 wherein the inner product-side layer further comprises a fourth layer, wherein the fourth layer comprises an e-beam top coating, and wherein the e-beam top coating is interposed between the lamination layer and the barrier layer.

39. The multi-layered packaging film of claim 19 wherein the metal comprises aluminum, aluminum oxide, or a combination thereof.

40. The multi-layered packaging film of claim 1 wherein the graphic element comprises text, an image, or a combination thereof.

41. A multi-layered packaging film comprising:
an outer print layer comprising (i) PHA and a first nucleating agent, (ii) a material selected from PLA, PBAT, PBS, cellophane, paper or a combination thereof, and (iii) a graphic element;
an inner product-side layer comprising (i) a barrier layer comprising metal, micro-fibrillated cellulose, nano-fibrillated cellulose, nano-crystalline cellulose, graphene, water-based primer coating, solvent-based primer coating, polyurethane-based primer coating, polyacrylate-based primer coating, PGA, phenoxy resins, magnetic nanoparticles, epoxy-microencapsulated amine, a silica deposition layer, or a combination thereof, (ii) a core layer comprising PHA, a second nucleating agent, and a biodegradable polymer selected from PLA, PBS, polybutene succinate adipate (PBSA), polyglycolic acid (PGA), poly(lactic-co-glycolic acid) (PLGA), PBAT, and a combination thereof, and (iii) a third layer comprising PHA and the second nucleating agent, the third layer being interposed between the barrier layer and the core layer; and
a lamination layer comprising an adhesive, an extrusion lamination resin, or a combination thereof, wherein the lamination layer is interposed between the outer print layer and the inner product-side layer;
wherein each of the first nucleating agent and the second nucleating agent is independently selected from the group consisting of erythritols, pentaerythritol, dipentaerythritols, anatase, wulfenite, aragonite, artificial sweeteners, stearates, mannitols, inositols, polyester waxes, nanoclays, behenamide, erucamide, stearamide, oleamide, polyhydroxybutyrate, sulfur, selenium, phosphorous, benzamide, and a combination thereof.

42. The multi-layered packaging film of claim 41 wherein the core layer and/or the third layer independently further comprises a filler selected from the group consisting of mineral fillers, bio-based fillers, and a combination thereof.

43. The multi-layered packaging film of claim 41 wherein the core layer further comprises a biodegradable polymer selected from the group consisting of PLA, PBS, PBSA, PGA, PLGA, PBAT, and a combination thereof.

44. The packaging article comprising the multi-layered packaging film of claim 1.

45. The packaging article of claim 44 wherein the packaging article is a food package.

46. A packaging article comprising the multi-layered packaging film of claim 41.

47. The packaging article of claim 46 wherein the packaging article is a snack food package.

48. The packaging article of claim 46 wherein the packaging article is a beverage package.

* * * * *